Jan. 18, 1927. 1,615,035
C. RASMUSSEN
WINDSHIELD
Filed Feb. 11, 1924 4 Sheets-Sheet 1
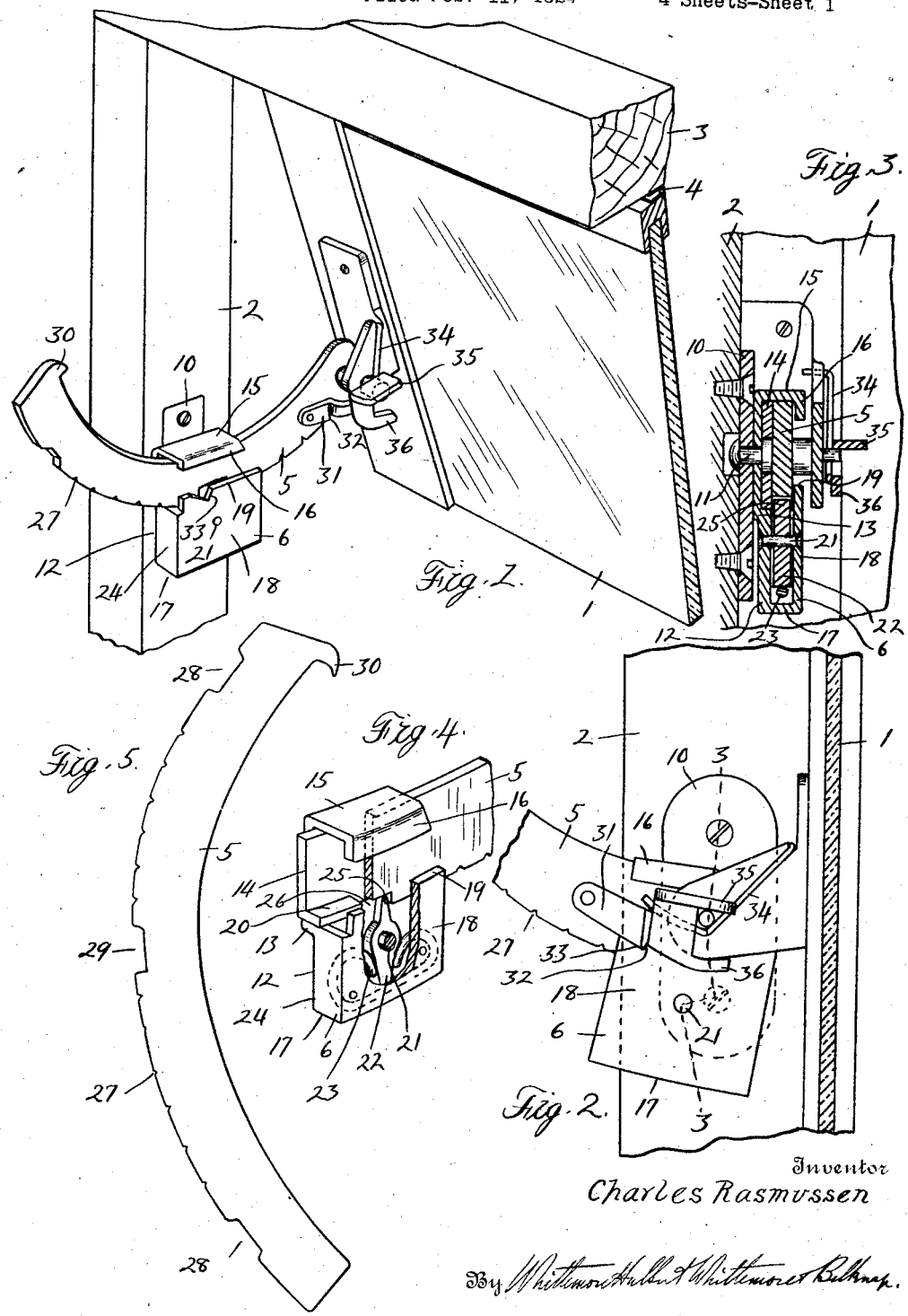
Inventor
Charles Rasmussen

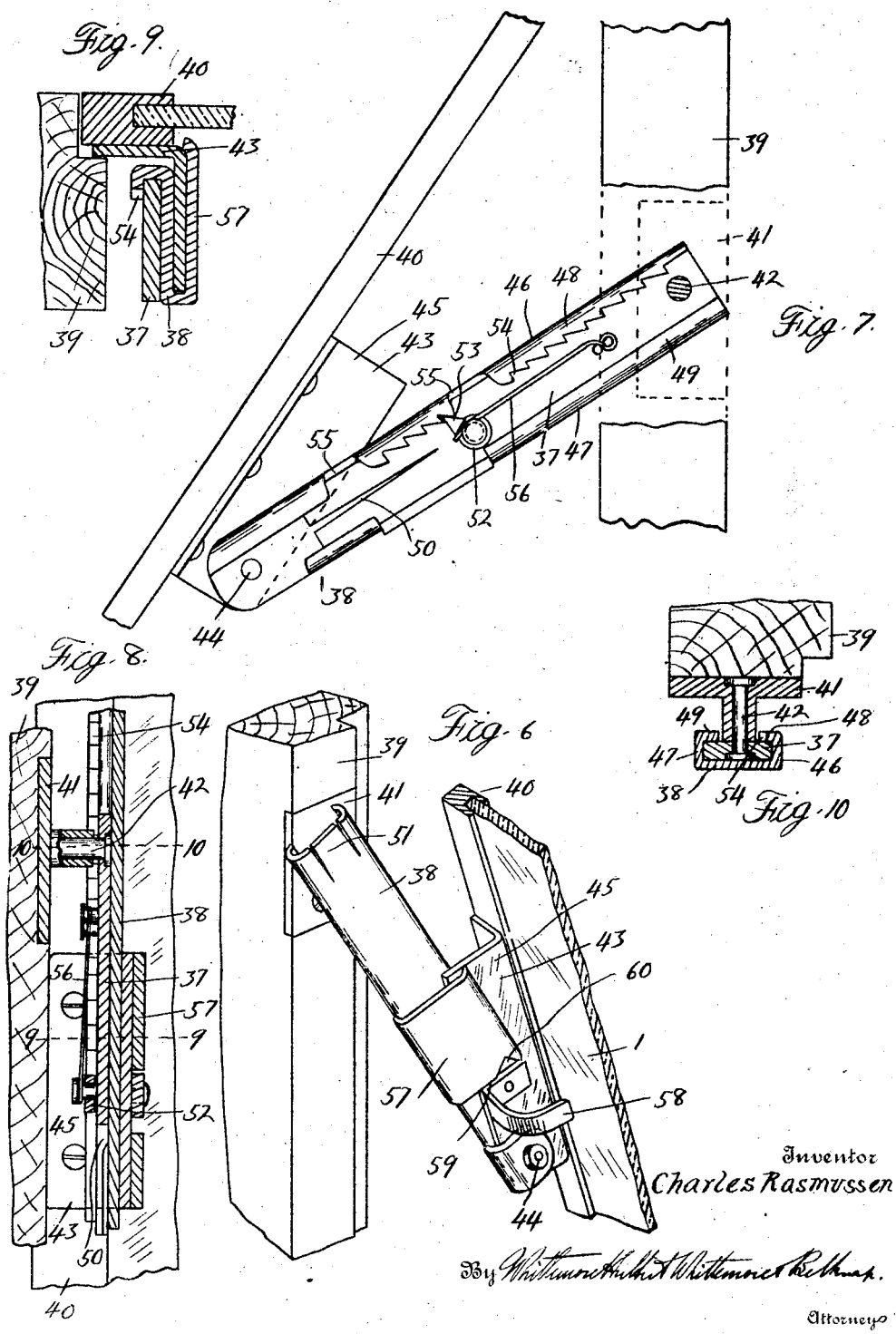

Jan. 18, 1927.
C. RASMUSSEN
1,615,035
WINDSHIELD
Filed Feb. 11, 1924    4 Sheets-Sheet 3
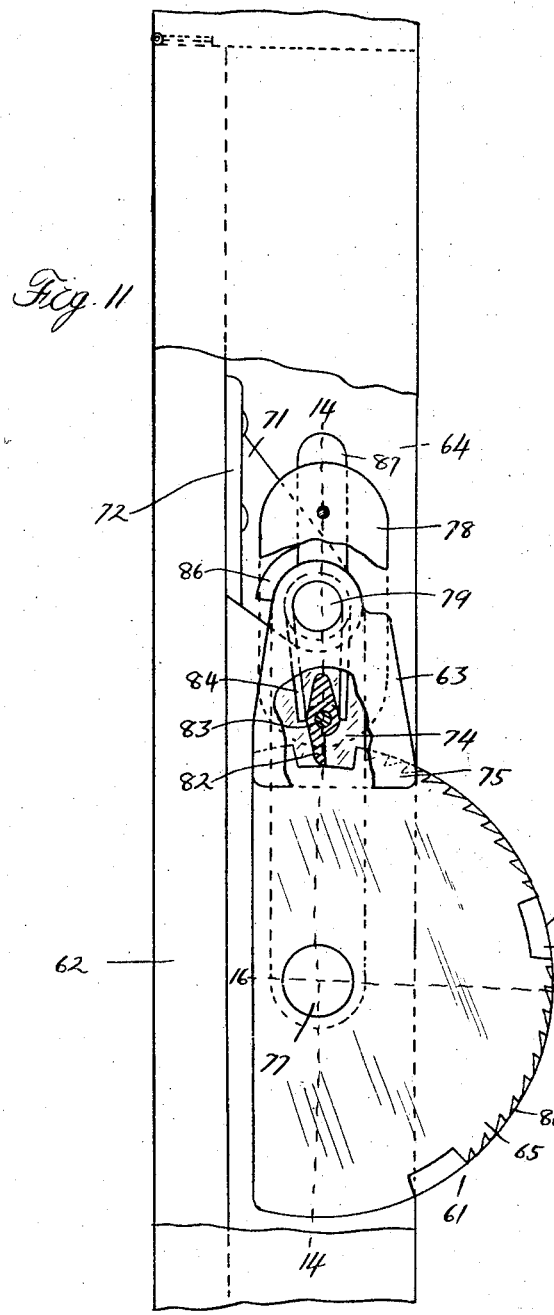
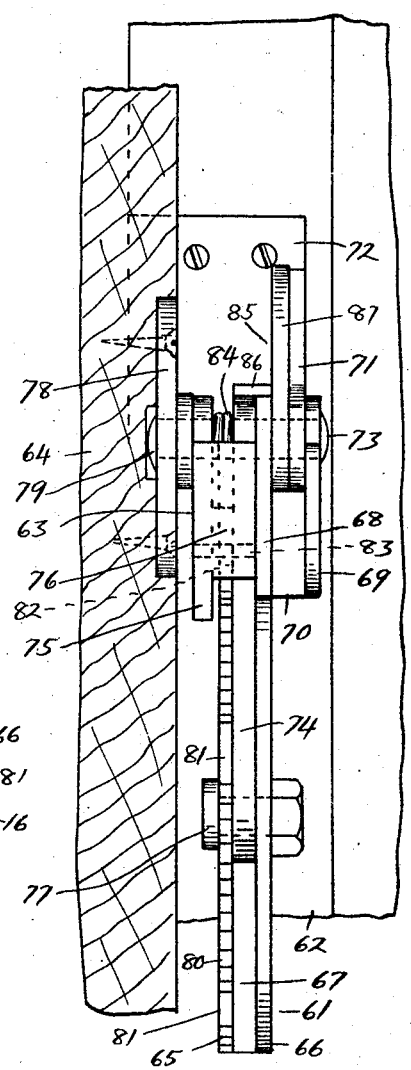
Inventor
Charles Rasmussen
Attorney Jan. 18, 1927.　　　　C. RASMUSSEN　　　　1,615,035
WINDSHIELD
Filed Feb. 11, 1924　　　4 Sheets-Sheet 4
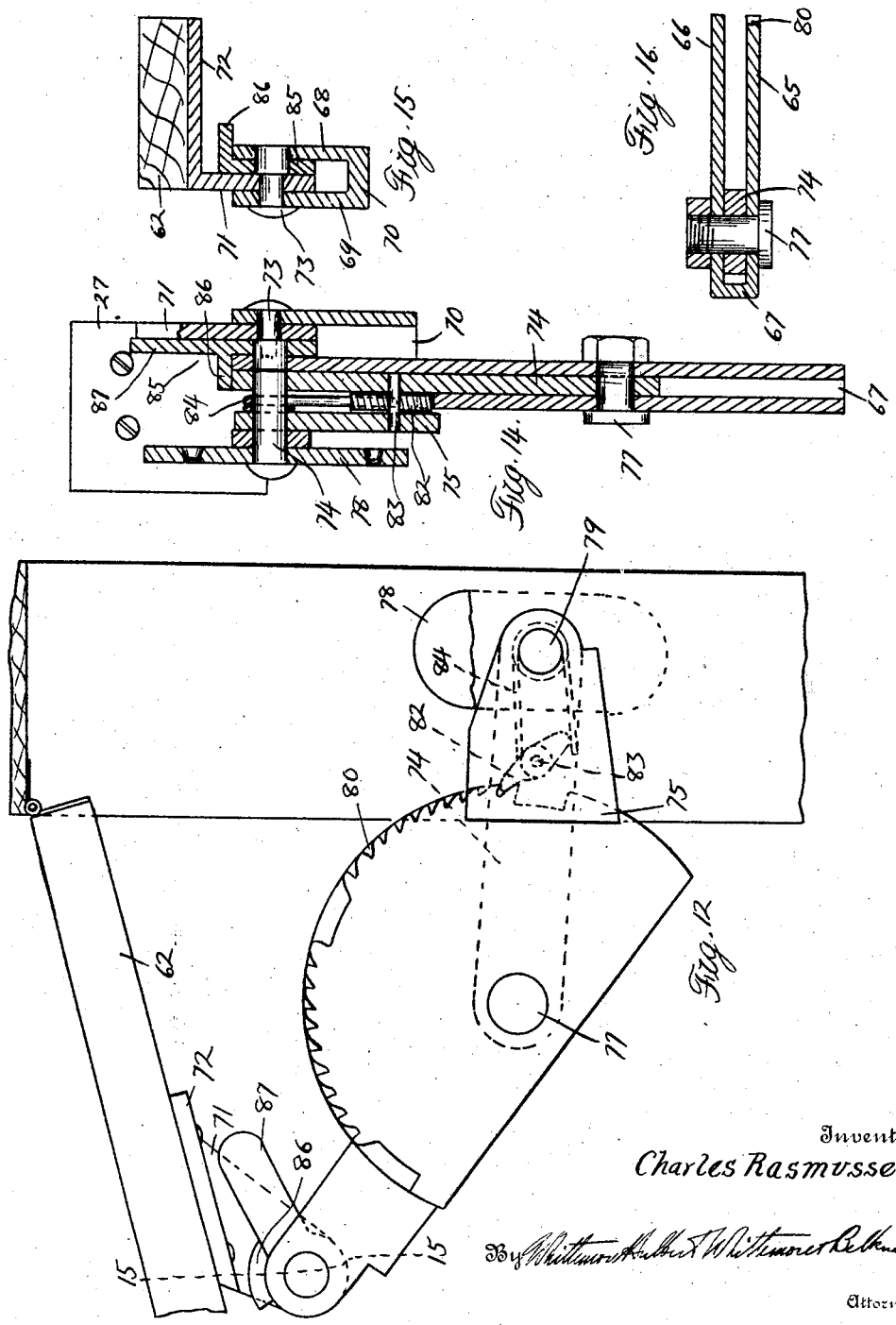
Inventor
Charles Rasmussen Patented Jan. 18, 1927.

1,615,035

UNITED STATES PATENT OFFICE.

CHARLES RASMUSSEN, OF TOLEDO, OHIO.

WINDSHIELD.

Application filed February 11, 1924. Serial No. 692,140.

The invention relates to windshields and refers more particularly to that type having a section which is adapted to be swung to various positions for ventilation purposes. One of the objects of the invention is the provision of a device between the swinging windshield section and the post at either end thereof for retaining the swinging section in its adjusted positions. Another object is the provision of a device which permits the swinging section to be returned to closed position. Further objects of the invention reside in the novel features of construction and combinations and arrangements of parts as more fully hereinafter set forth.

In the drawings:

Figure 1 is a perspective view of a portion of a windshield and a post showing the device for retaining the swinging section of the windshield in its adjusted positions;

Figure 2 is a side elevation with the swinging section of the windshield in closed position;

Figure 3 is a cross section on the line 3—3 of Figure 2;

Figure 4 is a perspective view partly in section of the device;

Figure 5 is a side elevation of the link of the device;

Figure 6 is a view similar to Figure 1 and showing a modified device;

Figure 7 is a side elevation thereof;

Figure 8 is a vertical section therethrough with the swinging section of the windshield in closed position;

Figures 9 and 10 are cross sections on the lines 9—9 and 10—10 of Figure 8;

Figure 11 is a side elevation showing another modified construction;

Figure 12 is a similar view with the swinging section of the windshield in an open position;

Figure 13 is an end view of Figure 11;

Figure 14 is a cross section on the line 14—14 of Figure 11;

Figure 15 is a cross section on the line 15—15 of Figure 12;

Figure 16 is a cross section on the line 16—16 of Figure 11.

The invention is applicable to windshields of either closed or open vehicles and as shown in the present instance is applied to a windshield of a closed vehicle in which 1 is the swinging windshield section and 2 a post at either end of the swinging section. In the present instance the swinging section is pivotally connected to the bar 3 by suitable means such as hinges 4, this bar extending between and being supported upon the posts 2.

To retain the swinging windshield section in its various positions of adjustment and at the same time to permit the swinging section to be swung from an open to closed position, I have provided a device connecting the swinging section 1 to each of the posts 2.

As shown in Figures 1 to 5 inclusive, this device comprises the link 5 which is pivotally connected to the swinging section 1. The guide 6 is pivotally connected to the post 2 and is slidably engaged in by the link, and the pawl 7 carried by the guide and engageable with the link retains the latter in its various positions of adjustment. The link is preferably curved longitudinally so that it will not project rearwardly to too great an extent.

8 is a bracket secured to the frame of the swinging section 1, and 9 is a pin pivotally connecting the front end of the link to the bracket and extending inwardly beyond the bracket for a purpose to be hereinafter described.

The guide 6 is pivotally connected to the bracket or plate 10 by means of the pin 11 which engages the upper portion of the outer wall 12 of the guide. This upper portion is offset outwardly at 13 to form a lateral shoulder, to support the spring leaf 14 which is engageable with the outer side of the link. 15 is a top wall integral with the outer wall 12 and terminating in the depending inner flange 16. 17 is a bottom wall integral with the outer wall 12 and terminating in an upwardly extending inner wall 18 having an upper terminal flange 19, which together with the depending flange 16, is contacted by the link 5 owing to the pressure exerted by the spring recess 14. The spring leaf has the inwardly extending flange 20 at its lower edge which supports the link 5.

The pawl 7 is journalled at its middle upon the pin 21 which extends between the lower portion of the outer wall 12 and the upwardly extending inner wall 18 of the guide 6, the lower end 22 of the pawl having its opposite sides engaged by the terminal loops of the spring 23 which is also carried in the lower portion of the guide. To protect the parts within the lower portion of the guide, the latter has integral ends 24 which have their upper edges in contact with the inwardly extending flange 20 of the spring leaf. The upper or free end 25 of the pawl extends freely through the slot 26 in the inwardly extending flange 20 and its nose is engageable with the series of minor notches 27 in the lower edge of the link 5. The length of the upper or free end of the pawl is such that when its nose is in engagement with a minor notch the pawl is inclined to the vertical. Also the rear side of the nose is straight so that the nose will drop in a minor notch when the swinging windshield section has been moved outwardly from closed position to thereby retain the swinging section in its adjusted position.

For the purpose of permitting the swinging windshield section to be returned from open to closed position, the series of minor notches 27 in the link 5 is interrupted by the major notches 28 at the ends of the link 5 and the major notch 29 substantially midway between the major notches 28. These major notches are of sufficient depth and length to permit the upper or free end of the pawl to freely engage and swing therein. With this arrangement, if the swinging windshield section is moved outwardly to an open position from closed position, return movement of the swinging section is prevented by engagement of the pawl in a minor notch. However, to return the swinging section to closed position, outward movement thereof is continued until the nose of the pawl engages in a major notch, after which the swinging section may be moved inwardly owing to the fact that the pawl upon inward movement is inclined in the opposite direction so that its nose slides over the notches. The front side of the nose is curved so that its position, after swinging the windshield section inwardly to immediately swing the same outwardly before the nose of the pawl engages in a major notch.

To prevent accidental disengagement of the link 5 from the guide 6, the rear end of the link has upon its upper edge the lug 30 which is engageable with the top wall 15 of the guide and limits the outward swinging of the windshield section.

For the purpose of retaining the swinging windshield section 1 in closed position, I have pivotally mounted near the outer end of the link 5 the latch 31 which is provided with the detent shoulder 32 engageable in the notch 33 in the upper terminal flange 19 of the inner wall of the guide. This latch is yieldably forced downwardly to engage its detent shoulder with the notch in the guide by means of the spring 34 having one end secured to the bracket 8 and having the other end engageable with an upper edge of the latch, an intermediate portion of the spring passing around the pivot 9. To prevent swinging of the latch to too great an extent in either direction, I have provided upon the upper edge of the latch the transverse flange 35 and upon the lower edge of the latch the projection 36, the flange having a portion and the projection also extending longitudinally forward of the latch and engageable with opposite sides of the pivot 9. This transverse flange also forms a grip portion for engagement by an operator to release the detent shoulder of the latch from engagement with the guide notch to allow outward movement of the swinging windshield section from closed position.

As shown in Figures 6 to 10 inclusive, 37 and 38 are cooperating telescopic links of a modified device, these links being respectively pivotally connected to the post 39 and the swinging windshield section 40. 41 is a bracket secured to the post and 42 is a pin in the bracket and pivotally connecting the upper end of the link 37 to the post. 43 is an angle-shaped bracket secured to the frame of the swinging windshield section, and 44 is a pin in the rearwardly extending flange 45 of the bracket and pivotally connecting the lower end of the link 38 to the swinging windshield section.

The link 38 has side flanges 46 and 47 terminating in transverse flanges 48 and 49 respectively, which extend toward each other. The link 37 slidably engages between these side flanges and also between these transverse flanges and the base of the link 38. For preventing rattling the lower end of the link 37 is longitudinally slit at 50 and both of its edges opposite this slot are positioned to resiliently engage the side flanges of the link 38. Furthermore, the link 38 has the resilient tongue 51 at its upper end which bears upon the link 37 to resilienly hold the same against the transverse flanges 48 and 49.

To hold the swinging windshield section in an open position, I have provided the pawl 52 pivoted upon the link 37 and having a nose 53 engageable in the series of minor notches 54 in the transverse flange 48 of the link 38, this series of minor notches being interrupted by major notches 55 which permit the nose of the pawl to freely engage therein and allow reversal of inclination of the pawl to permit return movement of the swinging windshield section to closed position. For yieldably holding the pawl so that its nose will engage in the notches there is the spring 56 having one end anchored to the link 37 and the other or free end engageable with an extension upon the nose and tending to maintain the pawl at right angles to the axis of the links.

To prevent rattle between the link 38 and the bracket 43 a tongue 57 is formed upon this link. This tongue is resilient and return-bent to embrace the rearwardly extending flange 45 of the bracket, the edge of this tongue being inturned to resiliently bear against the flange at all times when the swinging windshield section is in an open position and also to extend around the bend between the two flanges of the bracket when the swinging windshield section is closed to thereby resiliently maintain the swinging windshield section in closed position.

To lock the swinging windshield section closed there is the hand grip 58 pivoted upon the rearwardly extending flange 45 of the bracket 43 and having a shoulder 59 engageable in the notch 60 in the lower edge of the tongue 57.

Another modification of my device is shown in Figures 11 to 15 inclusive in which 61 is the lower link pivotally connected to the swinging windshield section 62, and 63 is the upper link pivotally connected to the post 64 and to the lower link. The lower link is formed in one-piece and comprises the segmental disk portions 65 and 66 connected at their straight edges by the web 67. The lower link further comprises the bifurcations 68 and 69, the bifurcation 68 being in the plane of the segmental disk portion 66 and the bifurcation 69 being offset and connected to the bifurcation 68 by the web 70. 71 is a rearwardly extending flange upon the bracket 72 which is secured to the swinging section 62, this flange extending between the bifurcations 68 and 69 and being pivotally connected thereto by the pin 73.

The upper link is also formed in one piece and comprises the bar 74 and the offset flange 75 connected to the bar by the web 76. The bar 74 extends between segmental disk portions 65 and 66 and is pivotally connected thereto by the pin 77 concentric with the peripheries of these segmental disk portions. The upper end of the offset flange 75 is pivotally connected to the bracket 78 by the pin 79, this bracket being secured to the post 64.

For retaining the swinging windshield section 62 in an open position, the segmental disk portion 65 of the lower link has the series of minor notches 80 interrupted by the major notches 81 and the upper link 63 pivotally carries the spring-pressure pawl 82, the free end of which is engageable in the notches in the same manner as the pawls of the two previously mentioned devices. As shown this pawl 82 is journalled on the pin 83 which extends between the offset flange 75 and the upper end of the bar 74 and the spring 84 is coiled around the pin 79.

To lock the swinging windshield section in closed position, I have provided the latch 85 which is journalled on the pin 73 and has a transverse flange 86 adapted to be swung by the integral handle 87 to a position immediately in advance of the upper end of the bar 74, thereby preventing relative swinging movement of the upper and lower links.

From the above description it will be readily seen that I have provided a simple device which may have a variety of forms and the parts of which may be readily and cheaply manufactured since they are of such shape that they may be stamped out. It will also be seen that this device will operate to positively retain the swinging windshield section in different positions of adjustment and at the same time permit the swinging windshield section to be returned to closed position. Furthermore, the arrangement of parts is such that they will be firmly held in contact with each other so that rattling is avoided.

What I claim as my invention is:

1. The combination with a post and a relatively movable windshield section, of a connection between said post and section including a link connected to one of said members and having interrupted series of notches, and a member connected to the other of said members and engageable in said notches, the said member being adapted to be released from engagement with the series of notches by the interruptions formed therein.

2. The combination with a swinging windshield section and a support therefor, of means for retaining the said windshield section in adjusted position including a link having a series of notches carried by one of said members and a member connected to the other of said members and engageable with the said notches, the said link being also provided with interruptions in said series of notches for releasing the engagement of the said member with the said notches.

3. The combination with a swinging windshield section and a post, of a link connected to one of said members and having an interrupted series of notches, and a pawl connected to the other of said members and engageable in said notches, the said pawl being adapted to be released from engagement with the series of notches by the interruptions formed therein.

4. The combination with a swinging windshield section and a post, of a link connected to one of said members and having a series of minor notches and a major notch in said series, and a member connected to the other of said members and engageable in said minor notches and rotatable in said major notch.

5. The combination with a swinging windshield section and a post, of cooperating members each pivotally connected to one of said first-mentioned members, one of said cooperating members having a series of notches with interruptions formed therein, and the other of said cooperating members having a member engageable in said notches, the said member being adapted to be released from engagement with the said notches, by the interruptions formed therein.

6. The combination with a swinging windshield section and a post, of cooperating members each secured to one of said first-mentioned members, one of said cooperating members having a series of notches with interruptions formed therein, and the other of said cooperating members pivotally carrying a pawl engageable in said notches, and rotatable in said interruptions.

7. The combination with a post and a relatively movable windshield section, of cooperating members each pivotally connected to one of said first-mentioned members, one of said cooperating members having an interrupted series of notches and the other of said cooperating members having a member engageable in said notches, and means including a resilient tongue carried by one of the members for holding said cooperating members in firm contact to avoid rattling.

8. The combination with a swinging windshield section and a post, of a link pivotally connected to one of said members and having an interrupted series of notches, a member connected to the other of said members and engageable in said notches upon swinging of said section from closed position, and means for retaining said link and notch engaging member from relative movement when said section is in closed position.

9. The combination with a swinging windshield section and a post, of a link having a series of notches pivotally connected to one of said members, a guide pivotally connected to the other of said members, said guide being slidably engageable in by said link, and a pawl pivoted upon said guide, and engageable in the said notches, the said link being also provided with recesses in said series of notches for releasing the engagement of the pawl with the notches.

10. The combination with a swinging windshield section and a post, of a link pivotally connected to one of said members and having an interrupted series of notches, a guide for said link pivotally connected to the other of said members, a member carried by said guide and engageable in by said notches and adapted to be released from engagement with the notches by the interruptions formed therein, and means for resiliently retaining said link in firm contact with said guide to prevent rattle.

11. The combination with a swinging windshield section and a post, of a link pivotally connected to one of said members, a guide for said link pivotally connected to the other of said members, cooperating means upon said link and guide for retaining said link in its positions of adjustment relative to said guide, and cooperating means upon said link and guide for locking the same from relative movement when said windshield section is in closed position.

12. The combination with a swinging windshield section and a post, of cooperating telescopic links each pivotally connected to one of said first-mentioned members, one of said links having a series of minor notches and a major notch in said series and the other of said links having a member engageable in said minor notches and rotatable in said major notch.

13. The combination with a swinging windshield section and a post, of cooperating telescopic links each pivotally connected to one of said first-mentioned members, one of said links having a plurality of recesses and notches between said recesses and a pawl carried by the other of said links engageable in said notches and rotatable in said recesses.

14. The combination with a swinging windshield section and a post, of cooperating telescopic links each pivotally connected to one of said first-mentioned members, cooperating means upon said links for retaining the same in various positions of relative lonigtudinal adjustment, and a resilient member upon one of said links for retaining said windshield section in closed position.

15. The combination with a swinging windshield section and a post, of a pair of pivotally connected cooperating links each being pivotally connected to one of said first-mentioned members, one of said links having a series of notches concentric with the pivot connecting said links and the other of said links carrying a pawl engageable in by said notches.

16. The combination with a swinging windshield and a support therefor, of means providing for selective adjustment of the windshield to a plurality of positions with respect to the support, said means including a link provided with a series of notches and a pawl for engagement with the notches, certain of the said notches being enlarged to permit reversing of the pawl.

In testimony whereof I affix my signature.

CHARLES RASMUSSEN.